United States Patent [19]

Betz et al.

[11] Patent Number: 4,484,079
[45] Date of Patent: Nov. 20, 1984

[54] REGISTRATION MARK DETECTOR

[75] Inventors: Howard T. Betz, Chesterton, Ind.; Edward J. Schulenburg, Jr., Danville, Ill.

[73] Assignee: HurletronAltair, Inc., Danville, Ill.

[21] Appl. No.: 315,950

[22] Filed: Oct. 28, 1981

[51] Int. Cl.³ .......................................... G01N 21/86
[52] U.S. Cl. ..................................... 250/548; 226/45
[58] Field of Search ............... 250/548, 557, 202, 568, 250/231 SE, 231 G; 226/45; 356/400, 401

[56] References Cited

U.S. PATENT DOCUMENTS

| | | | |
|---|---|---|---|
| 2,840,721 | 6/1958 | Frommer | 250/219 |
| 3,033,109 | 5/1962 | Frommer | 101/181 |
| 3,132,253 | 5/1964 | Sorsen | 250/548 |
| 3,774,014 | 11/1973 | Berler | 250/557 |
| 3,835,297 | 9/1974 | Inoue et al. | 250/557 |
| 4,301,363 | 11/1981 | Suzuki et al. | 250/548 |

Primary Examiner—David C. Nelms
Assistant Examiner—J. Brophy
Attorney, Agent, or Firm—Hill, Van Santen, Steadman & Simpson

[57] ABSTRACT

An improved optical scanner has a light source and a focusing element to direct the light to a region of an adjacent moving web. The sensor also includes a second focusing element to focus the reflected light onto a slit having a selected orientation. Electronic elements sense the light passing through the slit and generate an output control signal.

12 Claims, 6 Drawing Figures

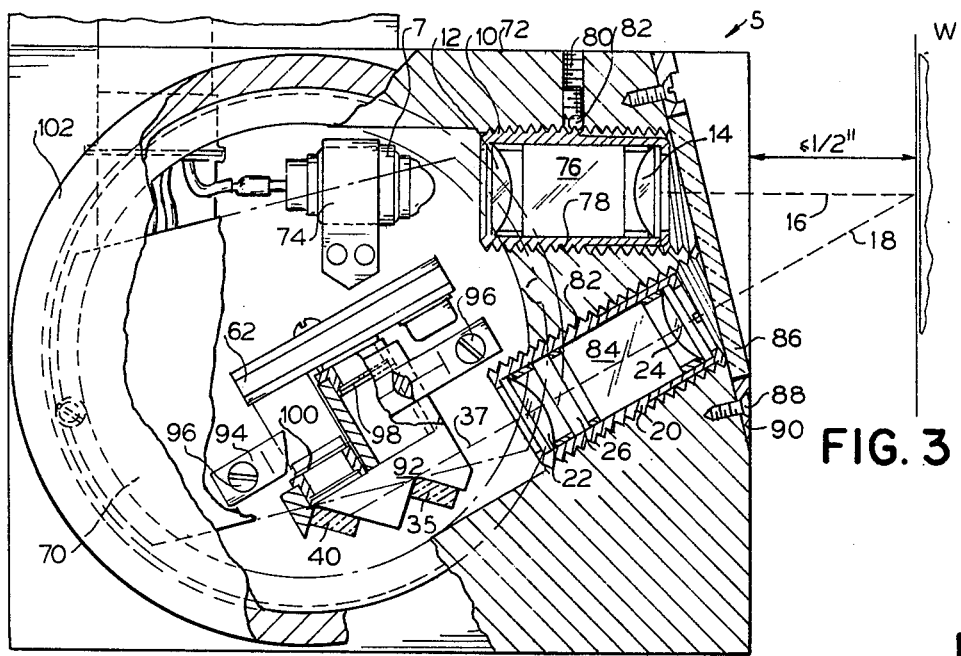
FIG. 3
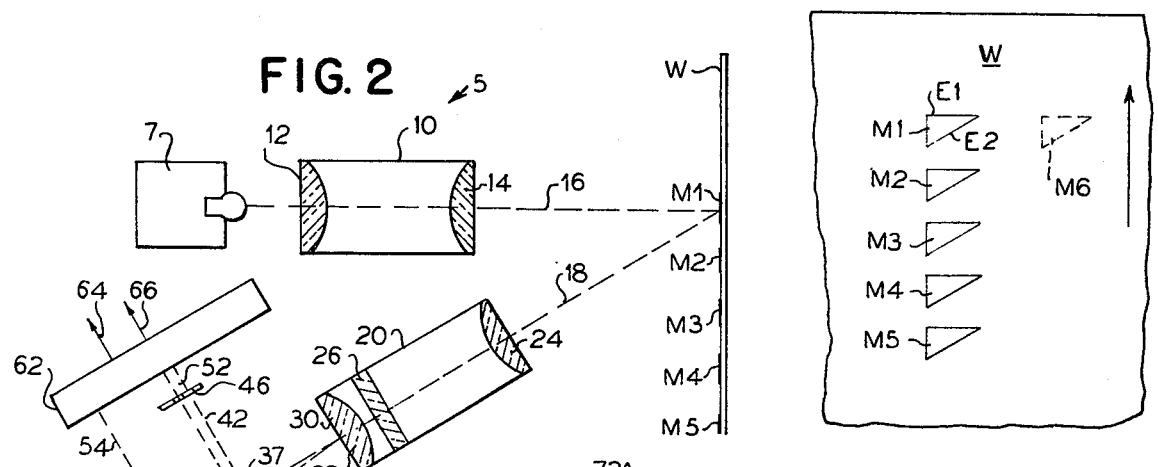
FIG. 2
FIG. 1
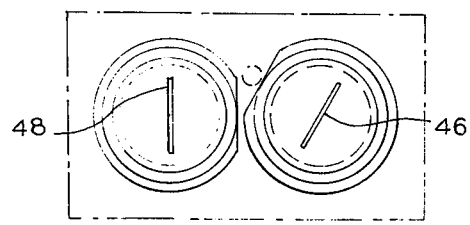
FIG. 4
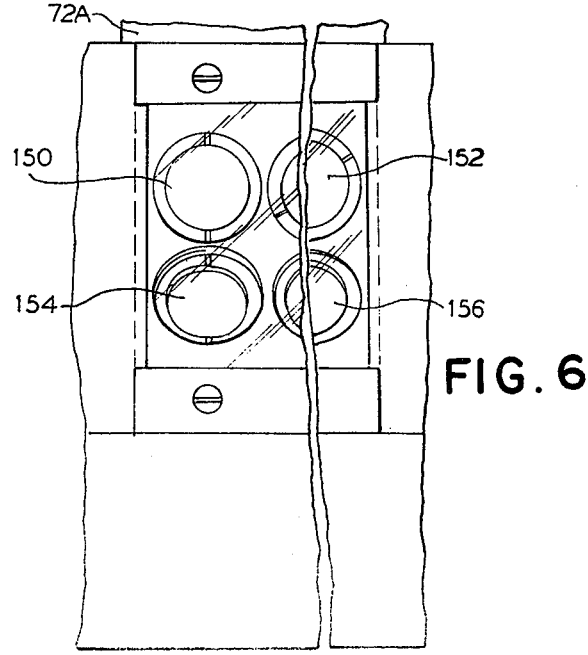
FIG. 6

REGISTRATION MARK DETECTOR

BACKGROUND OF THE INVENTION

1. Field of the Invention

The invention pertains to the field of optical sensing devices.

2. Description of the Prior Art

It has been known in the prior art to use light sensors to sense the presence of preprinted registration marks on a moving web. There have been difficulties with prior art sensors such as those disclosed in U.S. Pat. Nos. 2,840,721 and 3,033,109.

The prior art sensors have had a serious drawback in that they needed to be located about ⅛" away from the moving web. With such a short distance from the web to the sensor, there have been instances where a web splice passing under the sensor would cause the web to brush against the sensor. Ink then is rubbed off the web onto the sensor with the result that the sensor will not function reliably. When the press is being set up or the web broken and the press is being re-webbed, the closeness of the prior art sensors to the web path has also been a problem. Thus, there has been a need for a sensor that can be positioned further away from the web but still reliably detect the marks on the web, than had been possible with the prior art sensors.

SUMMARY OF THE INVENTION

The invention is an improved optical sensor adapted to detect the passage of pre-printed marks on a web. The sensor has a source of illumination that directs a beam of light against a selected region of the web. At a selected angle with respect to the direction of travel of the beam of light a focusing optical unit is positioned. This optical unit includes a pair of spaced apart focusing lenses which focus light reflected off of the web onto a filter slit. The focusing optical unit also includes a blue-green filter to enhance the contrast between the white web and the colored pre-printed marks.

On the other side of the filter slit is positioned a photo diode or similar detector. The photodiode is connected to operational amplifiers which convert current from the photodiode to a voltage and which then amplify that voltage to a usable output signal. Feedback elements form a control loop around one or more amplifying operational amplifiers to compensate for voltage variations or web color and density variations.

One embodiment of the invention includes a pair of mirrors positioned to split the light beam focused by the optical unit into two parts. One part of that lght beam is directed at a first slit, a second part is directed at a second slit. The two slits are oriented at 30° angles with respect to one another. This orientation corresponds to a 30° angle between a circumferential edge of a pre-printed mark and a lateral edge of the same mark. In this case, the marks have the form of a 30-60-90 degree right triangle. Two sets of electronics are used to sense the presence or absence of the light passing through the two slits.

In yet another embodiment of the invention, a second focusing optical unit is positioned in front of the light source to focus the beam onto the web. The entire unit can also be enclosed in an explosion-proof housing for use with inks whose vapors can be explosive. The slits are preferably rectangular with a size of 0.2 inches by 0.007 inches.

BRIEF DESCRIPTION OF THE DRAWINGS

FIG. 1 is a fragmentary view of a portion of a web showing pre-printed register marks usable with the present scanner.

FIG. 2 is a schematic diagram illustrating the optical paths in the present scanner.

FIG. 3 is a side view, partly broken away, to show the interior mechanical mechanism of the present scanner.

FIG. 4 is a view of the two optical filter slits.

FIG. 6 is a fragmentary front view showing two adjacent scanners in a single housing.

DESCRIPTION OF THE PREFERRED EMBODIMENTS

Figure 5:
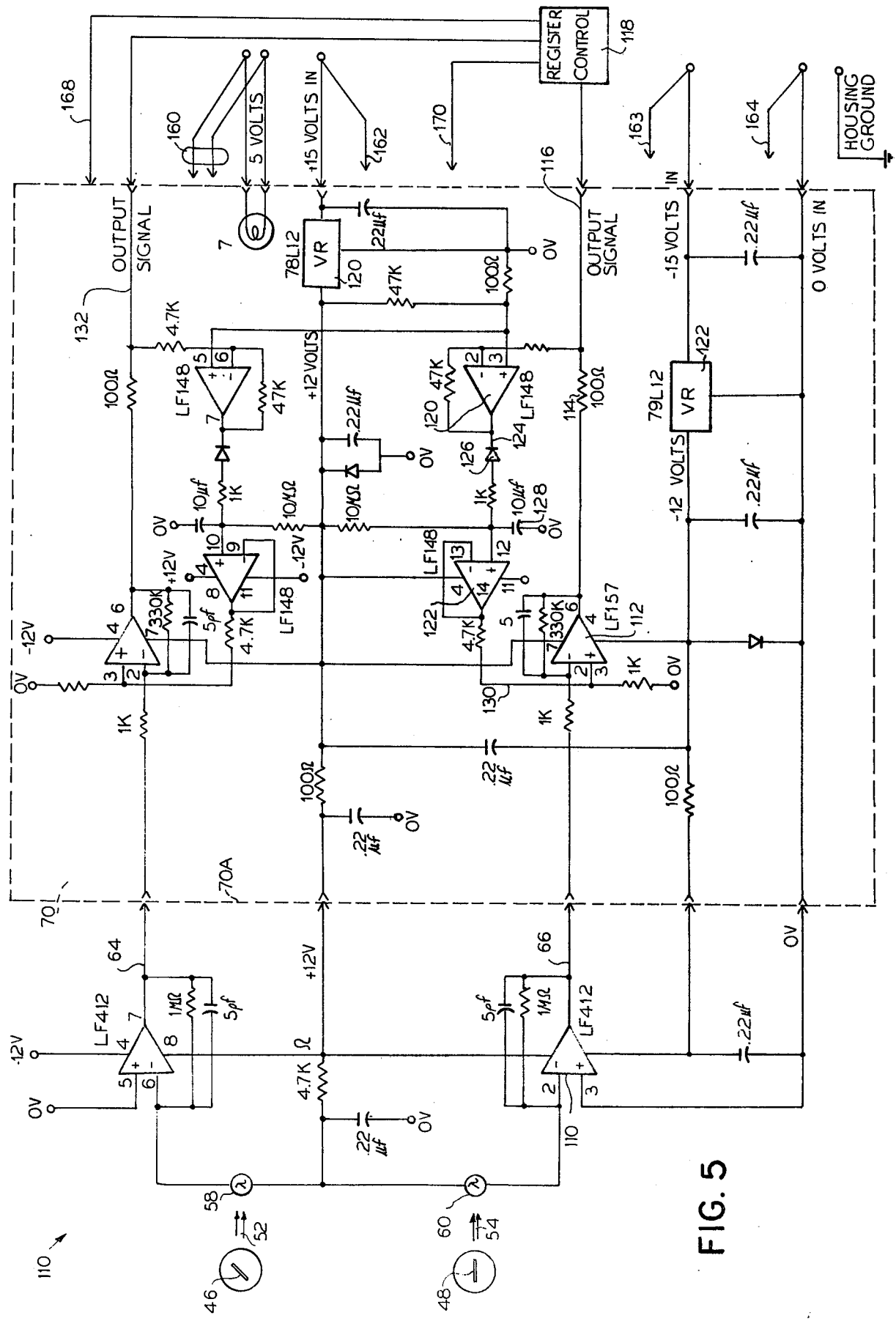
FIG. 5 is a schematic of the electronic circuitry of the present scanner.

Not by way of limitation, but by way of disclosing the best mnode of practicing our invention, and by way of enabling one of skill in the art to practice our invention, there is disclosed in FIGS. 1 through 6 one embodiment of our invention.

FIG. 1 discloses a fragmentary portion of a web W. Printed on the web W is a series of marks M1 through M6. Each of the marks M1 through M6 is a triangularly shaped registration mark. If one scanner is used, a series of different colored marks is placed in series along the web as shown in FIG. 1. In such an instance, a single scanner views each of the marks M1 through M5 sequentially. If more than one scanner or more than one sensing unit is used, marks are placed laterally across the web W such as M1 and M6. In this instance, the marks are read in parallel through a multiplicity of scanners.

Edges E1 and E2 of mark M1 are sensed for circumferential and lateral register control respectively. The edges E1 and E2 are at a 30° angle with respect to one another.

FIG. 2 is a schematic view of the optical structure of our scanner 5. Our scanner 5 includes a source of illumination 7 which generates a beam of light which is focused by a focusing unit 10. Focusing unit 10 includes two spaced apart focusing lenses 12 and 14. A focused beam of light 16 is shown in FIG. 2 impinging upon a region of a web W which contains the marks M1 through M5. Alternately, the arrangement of FIG. 2 could be used to sense marks such as M1 and M6 in FIG. 1. A stream of light 18 which bounces off of the region of the web W is focused by a focusing unit 20 within the scanner 5. The unit 20 includes two spaced apart focusing lenses 22 and 24 as well as a blue-green optical filter 26. The light paths 16 and 18 are at a selected angle of 30°.

Adjacent an output side 30 of the focusing unit 20 is a pair of mirrors 35 and 40. The mirrors 35 and 40 are arranged such that mirror 35 intersects and reflects approximately one-half of the output light beam 37 from the focusing unit 20. Mirror 40 reflects the remainder of the light beam 37. The two reflected light beams 42 and 44 are directed at a pair of rectangularly shaped slots 46 and 48, respectively. Each of the slots 46 and 48 is rectangularly shaped with a length of about two-tenths of an inch and a height of about 0.007 of an inch. The slots 46 and 48 act as mechanical filters for the incident light beams 42, 44. Light beams 52 and 54 which pass through the respective slots 46 and 48 respectively impinge upon optical sensor units 58 and 60, respectively.

Optical sensors 58 and 60, shown in FIG. 5, could be photodiodes or any other type of light sensitive semiconductor and are located in shielded unit 62. Signals on lines 64 and 66 from shielded unit 62 are connected to amplification circuitry on a printed circuit card 70 which generates a usable output signal.

FIG. 3 discloses the detailed mechanical structure of the optical scanner 5 shown schematically in FIG. 2. As shown in FIG. 3, scanner 5 has an explosion-proof housing 72 which supports the source of illumination 7 on a bracket 74. Light from the source of illumination 7 impinges upon focusing unit 10 which includes the lenses 12 and 14. Located between the lenses 12 and 14 is an acrylic optical plug 76 whose purpose is to make the focusing unit 10 also explosion-proof. Focusing unit 10 is positioned within housing 72 by means of threads 78. A set screw 80 which passes through the housing 72 and which drives a nylon ball 82 against the side of the focusing unit 10 locks the focusing unit 10 rigidly in position.

The housing 72 also supports the focusing unit 20 which includes the spaced apart focusing lenses 22 and 24. The unit 20 is positioned within the housing 72 by means of a set of threads 82. An acrylic optical plug 84 in the focusing unit 20 makes that unit also explosion-proof.

A transparent front cover 86 is held in place by screws 88 on a front surface 90 of the housing 72.

The output light beam 37 from the focusing unit 20 is reflected by the mirrors 35 and 40 as discussed previously. Mirrors 35 and 40 are supported by a framework 92 which in turn is held in place by a retaining strap 94 and screws 96. Slit 46 is located in the member 98. Slit 48 is located in the member 100. The light sensors 58 and 60 as discussed above are located within the shielded housing 62. The printed circuit board 70 is screwed into the housing 72 and covered by a plate 102 which makes the entire unit 72 explosion-proof. The unit 5 can be located at a distance greater than one-half inch from the web W.

We have found that a suitable filter 26 is a Corning No. 4303 filter. We have found that an appropriate light source is a Gilway L8006 lamp. We have found that lenses 12 and 14 each should have a 16.4 mm diameter with a 31.0 mm focal length. We have found that lenses 22 and 24 each should have a 16.4 mm diameter with a 43.0 mm focal length.

FIG. 4 discloses the two rectangularly shaped slots 46 and 48. Each of the slots 46 and 48 is preferably 0.2 inch long by 0.007 inch wide. The slots 46 and 48 are at an angle which corresponds to the angle between edges E1 and E2 which is preferably 30°.

FIG. 5 is a schematic diagram of the electronic circuitry of scanner 5. As shown in FIG. 5, light beams 52 and 54 which pass through the slots 46 and 48, respectively, and impinge upon the photodiodes 58 and 60, respectively. We have found that appropriate diodes for elements 58 and 60 are Silicon Detector Corp. diodes SD 172-12-22-021. The upper and lower halves of the electronic circuit 110 of FIG. 5 are identical. One is associated with the slot 48, the other is associated with the slot 46. The following description of the circuitry associated with the slot 48 would apply to corresponding elements associated with the slot 46.

A National Semiconductor Corp. operational amplifier 110 is connected to the photodiode 60. The operational amplifier 110 has a high input impedance and operates to convert a current signal from the photodiode 60 to a corresponding voltage signal on a line 66. All of the elements to the left of a line 78 and to the right of the slots 46 and 48 shown in FIG. 5 should be located within the shielded housing 62 for best results. The voltage on the line 66 which is proportional to the intensity of the light beam 54 provides an input to a National Semiconductor Corp. operational amplifier 112 which is connected as a voltage amplifier having a gain of 330. The output of amplifier 112 connected through a 100-ohm resistor 114 is an output signal on a line 116 which can be provided to a register control system 118 for purposes of controlling the register of the colors on the web W.

Two National Semiconductor Corp. feedback operational amplifiers 120 and 122 close a control loop around amplifier 112. An increase in voltage on the output line 116 is fed to a negated input 2 of the operational amplifier 120, causing a decreasing voltage to appear on a line 124. The decreasing voltage on the line 124 forward biases diode 126 thereby draining charge off of capacitor 128 and reducing the voltage on the input end 12 of the operational amplifier 122. Operational amplifier 122 is a unity gain device which then reduces its output voltage on a line 130 which is connected to an input pin 3 of the voltage amplifier 112. A decreasing voltage on the line 130 then tends to reduce the output voltage on the line 116 to compensate for DC level changes, power supply variations, web color changes, or changes in lamp spacing.

The upper half of the circuitry 110 on FIG. 5 also generates an output signal on a line 132 which is an indication of the presence or absence of the light beam 52. The output signal on the line 132 can also be sensed by the register control 118 for the purpose of controlling lateral register of the web W.

Voltage regulators 120, 122 provide a regulated source of positive and negative 12 volts to the circuitry within the sensor 5. Other elements on FIG. 5 perform conventional filtering and noise suppression functions. All signal diodes are IN4148.

FIG. 6 discloses a form of housing 72, 72a which includes two sets of light sources 150 and 152 as well as two sets of receivers 154, 156. Each of the light sources 150, 152 could correspond to the light source 7 and focusing unit 10 of the housing 5. Each of the receiver units 154, 156 could correspond to the focusing unit 20, mirrors 35 and 40, slots 46 and 48, as well as associated circuitry in the shielding 62. Hence, the dual unit of FIG. 6 can be used to simultaneously sense two adjacent marks such as M1 and M6 of FIG. 1.

All of the circuitry associated with the receiver unit 156 of FIG. 6 would be identical to the circuitry of FIG. 5. FIG. 5 indicates an input 160 for a second source of illumination, a second set of power lines 162 through 164 and a second set of output signals 168, 170.

We have found using the above noted component values that a sensor such as the sensor 5 can be positioned 1⅛ inches away from the web and still operate reliably.

While we have disclosed our invention with respect to a specific embodiment, it will be clear to those of skill in the art that various modifications and changes may be made with respect thereto. We wish to include within the claims warranted by the patent hereon all such modifications and changes as reasonably come within our contribution to the art.

We claim as our invention:

1. A scanner for detecting a plurality of discrete register marks on a rapidly moving web, said scanner being disposed at least one-half inch from said web and consisting of:
    a means for generating a light beam and for directing said light beam at a selected region of said rapidly moving web;
    a means for focusing light reflected from said moving web having at least one lens and being orientated at a selected angle with respect to the direction of travel of said light beam;
    a first deflector means onto which a first portion of the light reflected from said web is directed by said means for focusing light;
    a light sensor on which light deflected by said first deflector means is incident for generating an electrical signal proportional thereto;
    a first slot diaphragm disposed at a selected first angular orientation between said first deflector means and said sensor;
    a second deflector means onto which a second portion of the light reflected from said web is directed by said means for focusing light; and
    a second slot diaphragm disposed at a second selected angular orientation with respect to said first angular orientation of said first slot diaphragm between said second deflector means and said sensor,
said first and second orientations of said first and second slot diaphragms being selected to conform to the shape of said registration marks such that said light sensor generates a first signal in response to sensing a leading edge of a registration mark and a second signal in response to a trailing edge of the same registration mark.

2. The scanner of claim 1 wherein said first slot diaphragm has dimensions of approximately 0.2 inches by 0.0007 inches.

3. The scanner of claim 1 wherein said second slot diaphragm has dimensions of approximately 0.2 inches by 0.0007 inches.

4. The scanner according to claim 1 wherein said means for focusing light includes:
    first and second spaced apart focusing lenses and a blue-green filter.

5. The scanner according to claim 1 wherein said light sensor includes:
    solid state light detecting means adapted to generate a current proportional to the incident light,
    current to voltage conversion means connected to said light detecting means and adapted to convert the current to a voltage,
    means for amplifying connected to said current to voltage conversion means and adapted to amplify the voltage to generate an output voltage, and
    feedback means connected around said means for amplifying to automatically adjust and compensate said means for amplifying for voltage, web or light variations.

6. The scanner according to claim 5 wherein: said current to voltage conversion means comprises an operational amplifier, said means for amplifying comprises at least one operational amplifier and said feedback means comprises at least one operational amplifier.

7. The scanner according to claim 1 including further:
    second means for focusing, said second means for focusing being positioned adjacent said means for generating a light beam and being adapted to focus the generated beam of light on the web located at least one-half inch away.

8. The sensor according to claim 7 wherein said second means for focusing includes two spaced apart focusing lenses.

9. The scanner according to claim 1 including further an explosion-proof housing containing said scanner 10. The scanner according to claim 1 wherein said light sensor includes:
    light to current conversion means disposed for receiving light from said first deflector through said first slot diaphragm,
    current to voltage conversion means connected to an output of said light to current conversion means,
    means for amplification connected to an output of said current to voltage conversion means and adapted to generate an amplified output voltage of a selected magnitude indicative of sensing an edge of a register mark on the web,
    feedback means connected between an input and an output of said means for amplification and adapted to compensate for selected variations in power supply output values, web colors and variations in said light generating means, and wherein
    said light to current conversion means and said current to voltage conversion means are enclosed in a shielded housing.

11. The scanner according to claim 10 wherein said light sensor includes:
    second light to current conversion means disposed for receiving light from said second deflector through said second slot diaphragm,
    second current to voltage conversion means connected to an output of said light to current conversion means,
    second means for amplification connected to an output of said current to voltage conversion means and adapted to generate an amplified output voltage of a selected magnitude indicative of sensing an edge of a register mark on the web,
    second feedback means connected between an input and an output of said means for amplification and adapted to compensate for selected variations in power supply output voltages, web colors and variations in said light generating means, and wherein
    said second light to current conversion means and said second current to voltage conversion means are enclosed in said shielded housing.

12. A sensor adapted to be located at least one-half inch from a moving web to detect first and second edges of register marks previously printed on the moving web, the edges are positioned at a selected angle with respect to one another, said sensor comprising:
    a means for providing a focused beam of light directed at a selected region on the moving web through which the register marks will move,
    means for focusing light reflected from the moving web into a beam,
    means for splitting the focused beam of reflected light into first and second parts and for directing the first and second parts onto first and second respective rectangular slits, said slits have a selected angular orientation with respect to one another corresponding to the angular orientation of the edges of the register marks on the web, each said slit has dimensions substantially equal to 0.2 inches by 0.007 inches,
    first and second solid state electronic means for sensing light which passes through said first and second respective slits and for generating first and second electrical signals proportional thereto, said first and second solid state electronic means each include light to current conversion means, current to voltage conversion means connected to an output of said light to current conversion means, means for amplification connected to an output of said current to voltage conversion means and adapted to generate and amplify output voltage of a selected magnitude indicative of the presence of a sensed selected edge of a register mark on the web, feedback means connected between an input and an output of said means for amplification and adapted to compensate for selected variations in power supply output values, web colors and variations in said source of illumination and wherein said light to current conversion means and said current to voltage conversion means in said first and second solid state electronic means for sensing are enclosed in a shielded housing.

* * * * *